(12) United States Patent
Steinwender

(10) Patent No.: US 8,100,238 B2
(45) Date of Patent: Jan. 24, 2012

(54) MAGNETORHEOLOGICAL CLUTCH

(75) Inventor: Herbert Steinwender, Tobelbad (AT)

(73) Assignee: MAGNA Powertrain AG & Co KG, Lannach (AT)

( * ) Notice: Subject to any disclaimer, the term of this patent is extended or adjusted under 35 U.S.C. 154(b) by 824 days.

(21) Appl. No.: 12/218,484

(22) Filed: Jul. 15, 2008

(65) Prior Publication Data

US 2009/0026034 A1 Jan. 29, 2009

(30) Foreign Application Priority Data

Jul. 16, 2007 (DE) .......................... 10 2007 033 037

(51) Int. Cl.
*F16D 37/02* (2006.01)
(52) U.S. Cl. .................. 192/21.5; 192/58.41; 188/267.2
(58) Field of Classification Search .................. 192/21.5; 188/267.2
See application file for complete search history.

(56) References Cited

U.S. PATENT DOCUMENTS

| | | | | |
|---|---|---|---|---|
| 2,622,713 A * | 12/1952 | Rabinow | ...................... | 192/21.5 |
| 2,661,825 A * | 12/1953 | Winslow | ...................... | 192/21.5 |
| 5,598,908 A | 2/1997 | York et al. | | |
| 5,599,474 A * | 2/1997 | Weiss et al. | ................. | 252/62.52 |
| 7,588,131 B2 * | 9/2009 | Steinwender | ................. | 192/21.5 |
| 7,828,129 B2 * | 11/2010 | Steinwender | ................. | 192/21.5 |
| 2005/0188690 A1 | 9/2005 | Namuduri et al. | | |
| 2007/0023247 A1 | 2/2007 | Ulicny et al. | | |
| 2009/0026033 A1 * | 1/2009 | Steinwender et al. | ........ | 192/21.5 |

FOREIGN PATENT DOCUMENTS

| | | |
|---|---|---|
| AT | 008 304 U1 | 5/2006 |
| AT | 008 549 U1 | 9/2006 |
| EP | 0 356 145 A2 | 8/1989 |
| WO | WO2005098257 | 10/2005 |
| WO | WO 2005106275 A1 * | 11/2005 |
| WO | WO2006130434 | 7/2006 |
| WO | WO2006086807 | 8/2006 |

* cited by examiner

*Primary Examiner* — Richard M. Lorence
(74) *Attorney, Agent, or Firm* — Harness, Dickey & Pierce, P.L.C.

(57) ABSTRACT

A magnetorheological clutch includes a primary part, a secondary part and a magnet for the generation of a magnetic field. The primary part and the secondary part are rotatable relative to one another around an axis of rotation of the clutch, with the primary part being rotationally fixedly connected to at least one disk. The disk is surrounded by coupling gaps in which a magnetorheological medium is arranged. The thickness of the at least one disk along the coupling gap has a value of approximately 0.4 mm to approximately 1 mm, with the at least one disk being formed along the coupling gaps without material interruptions.

28 Claims, 3 Drawing Sheets

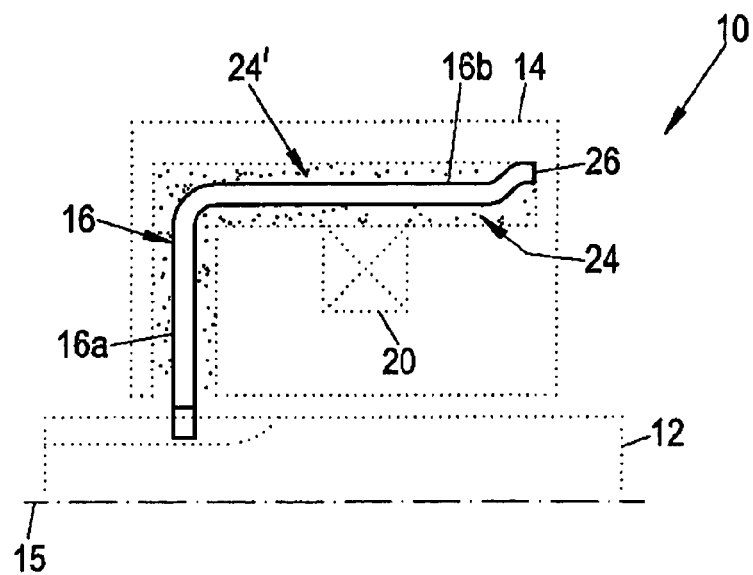
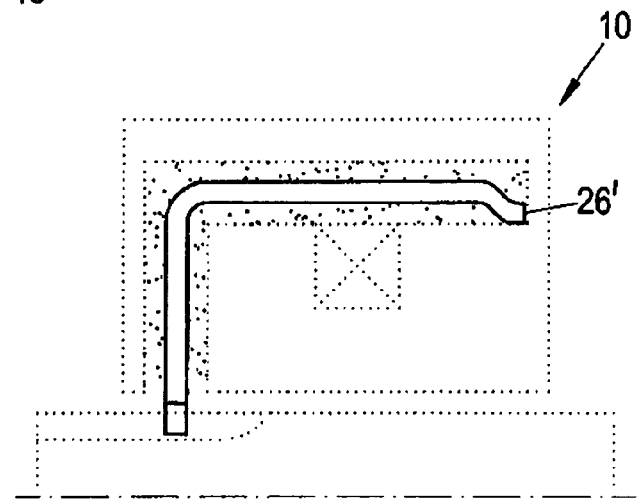
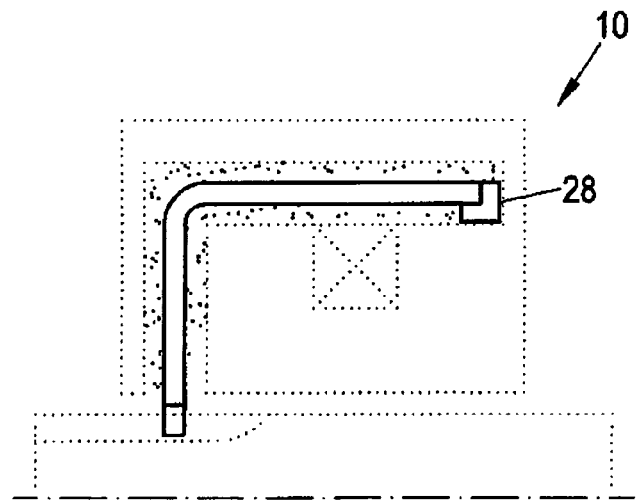

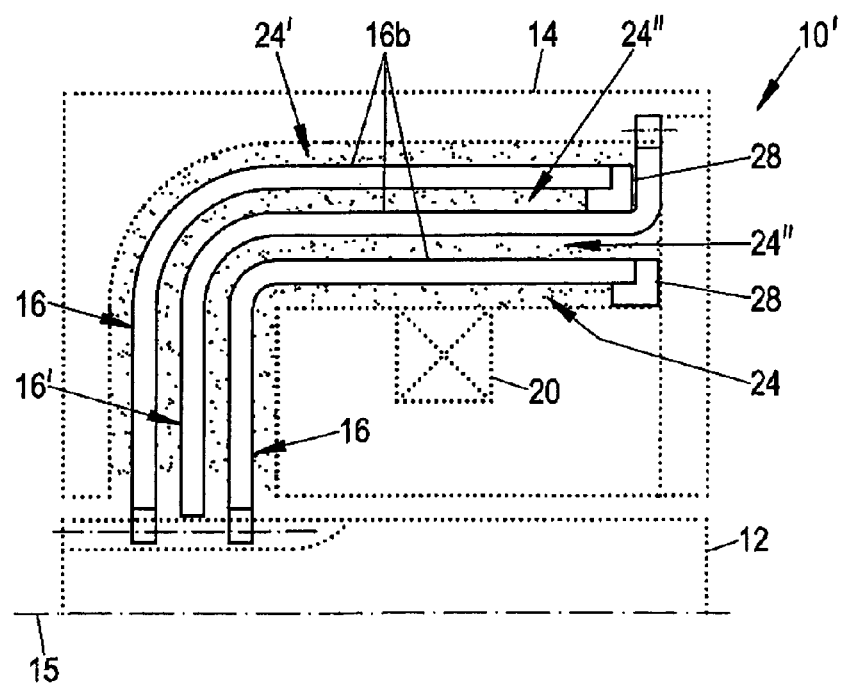
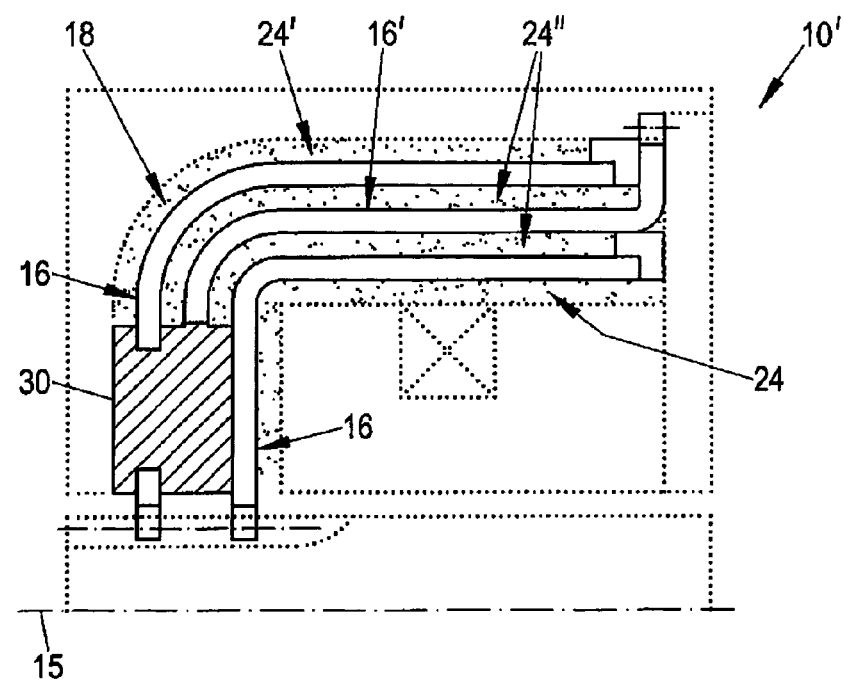

MAGNETORHEOLOGICAL CLUTCH

CROSS-REFERENCE TO RELATED APPLICATIONS

This application claims the benefit and priority of German Patent Application No. 10 2007 033 037.7, filed Jul. 16, 2007. The entire disclosure of the above application is incorporated herein by reference.

FIELD

The present invention relates to a magnetorheological clutch.

BACKGROUND

This section provides background information related to the present disclosure which is not necessarily prior art.

With a magnetorheological clutch, the degree of coupling between a primary part of the clutch and a secondary part of the clutch is controlled by a magnetic field (magnetic induction). The parameter regulating the coupling in this respect is the viscosity of a magnetorheological medium that is arranged between the primary part and the secondary part of the clutch, with the viscosity being dependent on the magnetic field. The magnetorheological medium may, for example, be a magnetorheological powder, gel, or fluid.

Magnetorheological multi-disk clutches are generally known whose primary part and secondary part are rotationally fixedly connected to disks. The disks connected to the primary part are arranged alternately with the disks connected to the secondary part. The gaps between the disks are filled with a magnetorheological medium, which has a viscosity that increases as the magnetic field strength increases. If the gaps are acted on by a magnetic field, the viscosity of the magnetorheological medium increases and a mechanical coupling is established between the disks of the primary part and the disks of the secondary part due to the increasing friction, whereby a torque transfer may take place from the primary part to the secondary part—or vice versa.

However, the disks—provided they are made of magnetizable material—have an effect that shields the magnetic field. To minimize the effect of the shielding and to provide a sufficiently strong magnetic field for the effective magnetization of the magnetorheological fluid in the plurality of coupling gaps disposed sequentially in the direction of the magnetic field, the disks are usually provided with openings (e.g. open slots or slots provided with plastic inserts). In other words, the disks have zones of smaller magnetic permeability to reduce the magnetic shield effect of the disks.

By this measure, the coupling gaps are acted on by a sufficiently strong magnetic field to cause the desired changes in viscosity of the magnetorheological fluid. However, the openings reduce the mechanical stability of the disks and, therefore, the load capability of the clutch. In addition, the establishing of the openings requires an additional production step, which has a negative effect on the manufacturing costs of the known clutches.

SUMMARY

The present disclosure provides a magnetorheological clutch that is robust and loadable, but that may also be produced in a cost-effective manner, on the other hand.

The magnetorheological clutch may include a primary part, a secondary part, and a magnet for the generation of a magnetic field. The primary part and the secondary part are rotatable relative to one another around an axis of rotation of the clutch, with the primary part being rotationally fixedly connected to at least one disk that is surrounded by coupling gaps. A magnetorheological medium is arranged in the coupling gaps. The thickness of the disk along the coupling gaps has a value in the range from approximately 0.4 mm to approximately 1 mm, with the disk being formed without material interruption along the coupling gaps.

In other words, the clutch may be a multi-disk clutch having at least one disk that is in contact with coupling gaps that are filled with a magnetorheological medium. As stated above, one of the characteristic properties of the magnetorheological medium is that its viscosity is a function of the strength of the magnetic field acting on the medium.

In contrast to known magnetorheological clutches, the disk may be made free of interruptions along the coupling gaps. This increases the stability of the disk, whereby higher torques may be transmitted by an input member connected to the clutch to an output member likewise connected to the clutch. A more stable disk enables the transmission of a higher torque with a given radial extent (with a plate disk) or with a given radial and axial extent (with cylinder disks or pot disks). Conversely, the clutch takes up less construction space than a comparably high-performance magnetorheological clutch.

The disk of the clutch additionally has a comparatively small thickness of approximately 0.4 mm to approximately 1 mm. Due to the small thickness of the disk, it may be brought to saturation at low field strengths (low saturation field strength/saturation induction) in comparison with the disks of conventional magnetorheological clutches. Since a magnetically saturated material behaves like a vacuum with respect to the magnetic field—is then therefore substantially "transparent" for the magnetic field—the corresponding disk already loses its shielding effect at low field strengths and the magnetic field also reliably reaches the coupling gap disposed after the disk in the field direction to effect a change in viscosity of the magnetorheological medium located therein. The saturation of the magnetorheological medium thus enters into all coupling gaps at lower magnetic field strengths than with known magnetorheological clutches with disks free of openings. The magnet and optionally an associated magnetic coil may accordingly be dimensioned smaller.

In other words, the small thickness of the disk brings about a "fast" magnetic saturation of the disk so that the use of specific soft magnetic materials is not necessary. The provision of openings in the disk may likewise be dispensed with.

In another embodiment of the clutch, the disk may have a hollow cylindrical section that is made without material interruptions and is arranged coaxially to the axis of rotation of the clutch.

Provision can additionally be made for the disk to have a base section, with the base section and the named hollow cylindrical section together defining a substantially pot-like disk body. Unlike the hollow cylindrical section, the named base section may have an opening that is arranged in its central region, for example. In other words, with this embodiment, the at least one disk is a pot disk in which the coupling by the magnetorheological medium substantially takes place in the coupling gaps extending parallel to the axis of rotation of the clutch. Such pot disks enable a compact construction of the clutch with a simultaneously high torque transmission power.

In an embodiment of the disk having only one hollow cylindrical section (i.e., without a base section), it is possible to speak of a cylinder disk. The coupling also takes place by the magnetorheological medium substantially in the coupling gaps extending coaxially to the axis of rotation of the clutch with cylinder disks.

In a further development of this embodiment, the thickness of the disk in the hollow cylindrical section along the coupling gaps has a value from approximately 0.6 mm to approximately 0.9 mm, in particular a value in the range from approximately 0.7 mm to approximately 0.8 mm. This thickness range ensures a good mechanical stability of the hollow cylindrical disk, on the one hand; on the other hand, the magnetic saturation of the disk is achieved with sufficiently low magnetic field strengths.

An alternative embodiment of the magnetorheological clutch provides that the disk is a plate disk. Such an aspect of the clutch is simple and cost-effective in construction.

In accordance with a further development of the embodiment comprising at least one plate disk, the thickness of the disk along the coupling gaps has a value of approximately 0.4 mm to approximately 0.8 mm. Such a thickness ensures a sufficient mechanical stability with a low saturation field strength (saturation induction) of the disk. Particularly low saturation field strengths result for a thickness of the disk along the coupling gaps in the range from approximately 0.4 mm to approximately 0.6 mm.

With respect to the aforesaid embodiments, it is desirable for most applications for the width of the coupling gaps (that is the spacing between the respective disk and the adjacent clutch part or the adjacent disk) to amount to 1 mm at the most. Investigations have shown that a gap width having a value in the range from approximately 0.3 mm to approximately 0.8 mm in combination with the aforesaid values of the disk thickness is particularly advantageous. With such a width of the coupling gaps, the magnetic field applied namely acts particularly efficiently on the magnetorheological medium in all of the coupling gaps so that only a weak magnetic field has to be applied. The coil used for the generation of the magnetic field may have correspondingly small dimensions. Overall, an advantageous, small-volume design of the magnetorheological clutch hereby results even if a plurality of mutually engaging clutch disks are required to accept or transfer the desired clutch torque. These advantages are achieved particularly effectively if the width of the coupling gaps has a value in the range from approximately 0.3 mm to approximately 0.6 mm.

With the pot disks explained above, the disk thickness in the hollow cylindrical section may in particular have a value in the range from approximately 0.6 to 0.9 mm; with a width of the coupling gaps in the range from approximately 0.3 mm to approximately 0.8 mm. A particularly efficient penetration of the magnetorheological medium by the applied magnetic field results with a thickness of the hollow cylindrical disk sections in the range from approximately 0.7 mm to approximately 0.8 mm in combination with a width of the coupling gaps in the range from approximately 0.3 mm to approximately 0.6 mm.

With respect to the plate disks described above, an efficient effect of the applied magnetic field on the magnetorheological medium results with a disk thickness in the range from approximately 0.4 mm to approximately 0.8 mm and with a width of the coupling gaps in the range from approximately 0.3 mm to approximately 0.8 m. A thickness of the clutch disks in the range from approximately 0.4 mm to approximately 0.6 mm in combination with a width of the coupling gaps in the range from approximately 0.3 mm to approximately 0.6 mm has proved to be particularly advantageous.

Provision may be made for the disk to be made from a material whose saturation induction is larger than 1.2 tesla. Such materials are thus not so-called soft magnetic materials, such as iron/nickel alloys, since the desired saturation of the disk material, as explained above, is already achieved by the small thickness of the disk. Materials whose saturation induction is larger than 1.5 tesla are in particular suitable. Accordingly, materials with a saturation induction of approximately 1.8 tesla may be used to manufacture the disk.

The disk may be made of non-alloyed quality steel, in particular of the steel types DC01, DC03, DC04 or DC05 or of alloyed quality steel, in particular the steel type DC06, with the steel sorts being defined by DIN EN 10027-1. These quality steels are cost-effective and have a high mechanical stability and suitable magnetic properties. Such quality steel was previously considered unsuitable for the manufacture of interruption-free disks for magnetorheological clutches with weak operating field strength of the magnet.

In accordance with a further embodiment of the magnetorheological clutch, a specific operating field strength of the magnet is provided, with the thickness of the disk and the operating field strength being coordinated with one another such that the disk is brought into a state of magnetic saturation at least sectionally—in particular along the coupling gaps—at the operating field strength of the magnet.

In an advantageous embodiment of the magnetorheological clutch, the magnet is a permanent magnet. One or more permanent magnets can, for example, represent a cost-effective and efficient alternative to an electrical magnetic field generation in applications for the limitation of a torque transmitted between the primary part and the secondary part.

Alternatively or additionally, the operating field strength of the magnet may be controllable by a control device associated with the magnet, with the magnet comprising at least one coil. The predetermined operating field strength of the magnet is therefore generated by a corresponding electric current feed of the coil. This makes it possible to variably control the degree of the coupling between the primary part and the secondary part. In this case, the disk is preferably brought into the stage of magnetic saturation at the maximum settable operating field strength of the magnet.

The magnet may furthermore be made such that in the embodiment of the clutch with at least one hollow cylindrical disk section, the magnetic field generated by the magnet is directed substantially perpendicularly to the axis of rotation of the clutch in the region of the hollow cylindrical section. In other words, the components of the magnetic field relevant to the mechanical coupling of the disk with a clutch having at least one cylinder disk or pot disk are aligned radially to the axis of rotation of the clutch. With a clutch having at least one plate disk, the relevant magnetic field component preferably extends parallel to the axis of rotation of the clutch.

The magnet may include a plurality of coils that each have at least one coil core and are separated from one another by an insulating material with a low magnetic permeability, whereby the homogeneity of the magnetic field acting on the coupling gaps can be improved in a simple manner.

The clutch may also be configured as a brake, with the primary part or the secondary part being arranged in a stationary manner.

In accordance with a further embodiment, the magnetorheological clutch has a plurality of disks that are alternately rotationally fixedly connected to the primary part or rotationally fixedly to the secondary part, with a plurality of coupling gaps being formed between the disks in which a magnetorheological medium is arranged. Such clutches having a plurality of disks enable the transmission of larger torques.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 2a to 2c illustrate different aspects of a disk for the minimization of a connection between the coupling gaps, each in a partial view; and FIGS. 3a and 3b illustrate further embodiments of the magnetorheological clutch in accordance with the invention with a plurality of disks, each in a partial view.

DETAILED DESCRIPTION

Example embodiments will now be described more fully with reference to the accompanying drawings.

Figure 1A:
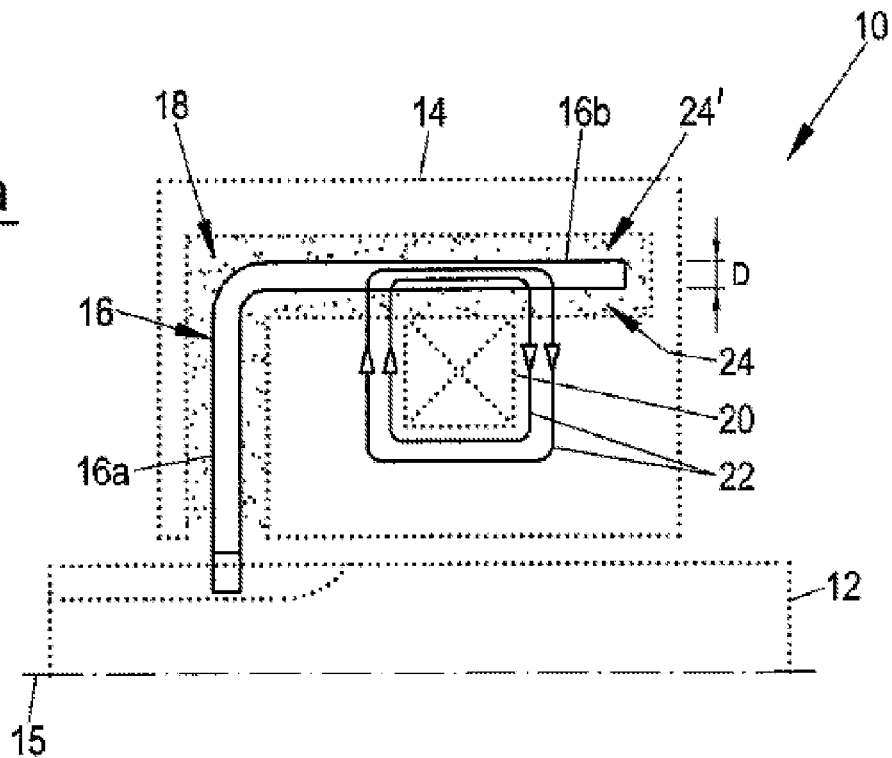
FIG. 1a illustrates an embodiment of the magnetorheological clutch in a partial view.

FIG. 1a shows a magnetorheological clutch 10 including a clutch hub 12 and clutch basket 14. The clutch hub 12 is, for example, connected to an input shaft (not shown) whereas the clutch basket 14 may be connected to an output shaft (not shown). Torque may be transmitted from the input shaft to the output shaft by the establishing of a coupling between the clutch hub 12 and the clutch basket 14.

For this purpose, a pot-shaped disk 16 is rotationally fixedly connected to the clutch hub 12. The disk 16 is arranged within an L-shaped hollow space 18 in the interior of the clutch basket 14. The clutch hub 12, the clutch basket 14 and the disk 16 have a shape substantially rotationally symmetrical to an axis of rotation 15 of the magnetorheological clutch 10. The disk 16 drawn in FIG. 1a may therefore be described as "pot-shaped". It includes a base section 16a extending perpendicular to the axis of rotation 15 and a hollow cylindrical section 16b extending parallel to the axis of rotation 15.

The hollow space 18 may be sealed by seals (not shown) in the region of the base section 16a close to the clutch hub 12 so that a magnetorheological medium arranged in the hollow space 18 cannot leave it.

To transfer a torque from the input shaft via the clutch hub 12 and the clutch basket 14 to the output shaft, a coupling must be established between the disk 16 and the clutch basket 14. This is done by changing the viscosity of the magnetorheological medium—which may, for example, be a powder, a gel or a fluid—in two coupling gaps 24, 24' by the application of a magnetic field. The coupling gaps 24, 24' are part of the hollow space 18 and are substantially arranged in the region of the hollow cylindrical section 16b of the disk 16 between the disk 16 and a radially inwardly disposed part of the clutch basket 14 and a radially outwardly disposed part of the clutch basket 14.

The hollow cylindrical section 16b does not have any interruptions, material changes or relevant variations of a disk thickness D. The disk thickness D—briefly the thickness D—is to be understood here as the thickness of the disk 16 in the extent of the hollow cylindrical section 16b in a radial direction with respect to the axis of rotation 15 of the clutch 10.

The magnetic field is generated by a magnet 20 that may, for example, be an electromagnet (i.e., an electrically excitable coil is associated with the magnet 20). The magnet generates a magnetic field—symbolically represented by magnetic field lines 22—in the region of the hollow space 18 in which the hollow cylindrical section 16b of the disk 16 extends, the magnetic field substantially only having a radial component. The radial component is to be understood as that component of the magnetic field that extends perpendicular to the axis of rotation 15.

In other words, the magnetic field passes through the magnetorheological medium in the coupling gap 24 in substantially the radial direction. In the disk 16, the magnetic field lines 22 are broken into the hollow cylindrical section 16b due to a higher permeability of the disk material compared with the permeability of the magnetorheological medium and extend substantially parallel to the axis of rotation 15 in the disk 16. The magnetic field lines 22 leave the disk material again to form the closed magnetic field lines 22.

It can be seen from FIG. 1a that, with the applied magnetic field strength—symbolized by two magnetic field lines 22—the radially outwardly disposed coupling gap 24' is not passed through by the magnetic field lines 22, since the disk 16 shields the magnetic field. The magnetorheological medium contained therein may, therefore, not contribute to the increase of the coupling between the disk 16 and the coupling basket 14.

Figure 1B:
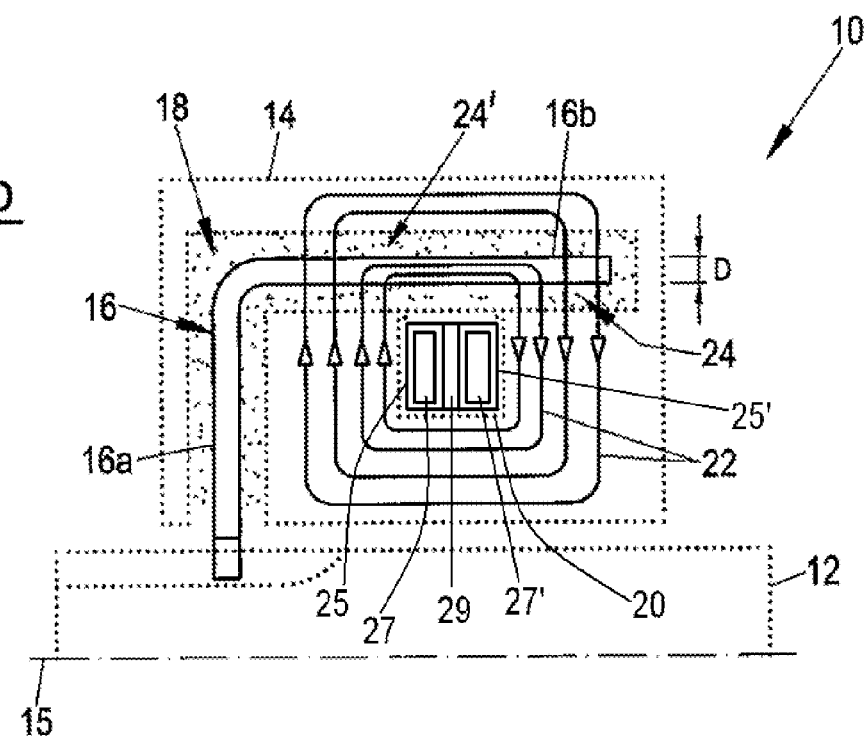
FIG. 1b illustrates the embodiment of FIG. 1a with a stronger magnetic field.

To increase the mechanical coupling, the strength of the applied magnetic field (i.e., the magnetic induction) must, therefore, be increased, as symbolized in FIG. 1b by four closed magnetic field lines 22. If the disk material reaches the state of a magnetic saturation from a specific magnetic field strength onward, it is "transparent" for the magnetic flux going beyond this and acts like a vacuum with respect to its magnetic properties. A part of the applied magnetic field now also passes through the radially outwardly disposed coupling gap 24'. The viscosity of the magnetorheological medium is thereby also increased there and the coupling between the disk 16 and the clutch basket 14 is amplified. An improved transmission of a torque from the clutch hub 12 to the clutch basket 14 is the result.

The magnetic field shielding effect of the disk 16 thus has a disadvantageous effect on the efficiency of the magnetorheological clutch 10. Conventionally, an attempt is made by the provision of openings in the disk 16 to provide magnetically transparent regions through which a part of the magnetic field can pass substantially free of loss. However, this measure results in structurally weakened clutch disks.

In order not to excessively restrict the stability of the disk 16, the provision of openings is dispensed with. The magnetic saturation of the disk 16 is deliberately accepted and encouraged in that the disk is made thin at least in the hollow cylindrical section 16b that extends perpendicular to the magnetic field lines 22 and may, therefore, be brought quickly to saturation. A suitable value range of the disk thickness covers approximately 0.4 mm to approximately 1 mm and is, therefore, approximately in the order of magnitude of the width of the coupling gaps 24, 24' which amounts to approximately 1 mm or preferably less.

FIG. 1b also depicts magnet 20 including a plurality of coils 25, 25' each having at least one coil core 27, 27' and which are separated from one another by an insulating material 29 with a low magnetic permeability. The multi-coil arrangement depicted in FIG. 1b provides merely one example of the internal construction of magnet 20.

The basic idea underlying the magnetorheological clutch 10, therefore, differs from the previously pursued concepts, which provide regions of greatly reduced permeability. In contrast, the disk 16 of the magnetorheological clutch 10 has a substantially constant permeability and thickness D in the hollow cylindrical section 16*b* and is only made of one single material, which has an advantageous effect on the production costs of the clutch 10. In addition, conventional—non-alloyed or alloyed—quality steels may be made use of for the manufacture of the disk 16, which are both cost-effective and sufficiently stable for the uses provided. The steel sorts DC01, DC03, DC04, DC05 and DC06 (in accordance with DIN EN 10027-1), for example, prove to be special.

FIGS. 2*a* to 2*c* show modifications of the end of the hollow cylindrical section 16*b* of the disk 16 disposed opposite the base section 16*a*.

FIG. 2*a* shows a brim-like, outwardly bent end 26 of the hollow cylindrical section 16*b* which contacts a radially outwardly disposed section of the clutch basket 14 to close the connection between the two coupling gaps 24, 24' or at least to reduce it. Such a connection enables an unwanted flow of the magnetorheological medium from radially inwardly to outwardly during the operation of the clutch 10' due to the effect of the centrifugal force. This may result in the unmixing of the magnetorheological medium, which has a negative influence on the dependence of the viscosity increase on the magnetic field strength.

A brim-like end 26' is shown in FIG. 2*b* that extends radially inwardly and contacts a radially inwardly disposed section of the clutch basket 14 to prevent the unmixing of the magnetorheological medium discussed above or at least to minimize it.

Alternatively or additionally, a ring element 28 may be provided as a seal which interrupts the connection between the coupling gaps 24, 24' at least partly. In addition, the ring element 28—as in another respect also the brim-like ends 26, 26'—serves for the maintenance of a defined spacing between the disk 16 and the inner surfaces of the hollow space 18. The ring element 28 may, for example, be made of plastic or of copper.

FIG. 3*a* shows a magnetorheological clutch 10' that has a plurality of disks 16, 16', with the disks 16 being rotationally fixedly connected to the clutch hub 12. A disk 16', which is rotationally fixedly coupled to the clutch basket 14, is arranged between the disks 16. In other words, the disks 16, 16' are alternately rotationally fixedly connected to the clutch hub 12 or rotationally fixedly connected to the clutch basket 14. Further coupling gaps 24", therefore, result between the disks 16 and the disk 16' in addition to the coupling gaps 24, 24' between the disks 16 and the inner walls of the hollow space 18. With such an arrangement of a plurality of disks 16, 16', the concept for the minimization of the shielding character of the disks 16, 16' is of special importance in order not to have to make the magnet 20 excessively powerful.

Analogous to FIG. 2, the free ends of the hollow cylindrical sections 16*b* of the disks 16 are provided with ring elements 28. The disk 16' is dimensioned such that there is only a very small spacing, or no spacing at all, between its free end and the clutch hub 12 to close the connection between the coupling gaps 24" and to counter the unmixing of the magnetorheological medium.

FIG. 3*b* shows a modification of the magnetorheological clutch 10' of FIG. 3*a*. To reduce the volume of the magnetorheological medium required for the filling of the hollow space 18, the magnetorheological clutch 10' has a block 30 that bounds the radially inwardly disposed end of the hollow space 18. Like the ring elements 28, the block 30 may also be made of a substantially diamagnetic material. The block 30 may also replace parts of the outer disk 16 since the magnetic properties of the base sections 16*a* of the disks 16, 16' only have an insignificant effect on the efficiency of the magnetorheological clutch 10'. It is, however, important that the hollow cylindrical sections 16*b* of the disks 16, 16' are made free of interruptions.

It is easily understandable that clutches may also be provided with two disks or more than three disks.

The above statements also apply accordingly—naturally apart from the aspects relating to the base sections 16*a*—to cylinder disks. Cylinder materials may, for example, be carried by sections of the primary part and of the secondary part extending in the radial direction.

Magnetorheological clutches with plate disks—that is with ring-shaped disks only extending in the radial direction with respect to the axis of rotation of the clutch—may likewise be made in accordance with the basic inventive idea. With such magnetorheological clutches, the component of the magnetic field relevant to the change in viscosity of the magnetorheological fluid extends substantially parallel to the axis of rotation of the clutch, that is in the axial direction. In this case, too, as with the magnetorheological clutches 10, 10' treated above with at least one pot disk, the magnetic field is perpendicular to the coupling gaps. The corresponding plate disks are likewise made free of interruptions.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A magnetorheological clutch comprising:
    a primary part, a secondary part, and a magnet for generating a magnetic field; and
    a disk that is surrounded by a pair of coupling gaps in which a magnetorheological medium is arranged,
    wherein at least one of the primary part and the secondary part are rotatable relative to the other around an axis of rotation of the clutch, with the primary part being rotationally fixedly connected to the disk; and
    a thickness of the disk along the coupling gaps has a value in a range from approximately 0.4 mm to approximately 1 mm, with the disk being formed along the coupling gaps without a material interruption.

2. The magnetorheological clutch of claim 1, wherein the disk has a hollow cylindrical section that is made without material interruption and is arranged coaxially to the axis of rotation.

3. The magnetorheological clutch of claim 2, wherein the disk has a base section, with the hollow cylindrical section and the base section together defining a substantially pot-like disk body.

4. The magnetorheological clutch of claim 2, wherein the thickness of the disk in the hollow cylindrical section has a value in a range from approximately 0.6 mm to approximately 0.9 mm.

5. The magnetorheological clutch of claim 2, wherein the magnetic field generated by the magnet is directed substantially perpendicular to the axis of rotation of the clutch in the region of the hollow cylindrical section of the disk.

6. The magnetorheological clutch of claim 1, wherein a width of the coupling gaps has a value in the range from approximately 0.3 mm to approximately 0.8 mm.

7. The magnetorheological clutch of claim 1, wherein the disk is made of a material whose saturation induction is larger than 1.2 tesla.

8. The magnetorheological clutch of claim 1, wherein the disk is produced from a quality steel selected from the group consisting of DC01, DC03, DC04, DC05, and DC06.

9. The magnetorheological clutch of claim 1, wherein the thickness of the disk and an operating field strength of the magnet are coordinated with one another such that the disk is brought into a state of magnetic saturation at least sectionally at the operating field strength.

10. The magnetorheological clutch of claim 1, wherein the magnet is a permanent magnet.

11. The magnetorheological clutch of claim 1, wherein the magnet has a controllable operating field strength that is controllable by a control device associated with the magnet, the magnet including at least one coil.

12. The magnetorheological clutch of claim 1, wherein the magnet comprises a plurality of coils that each have at least one coil core and that are separated from one another by an insulating material with a low magnetic permeability.

13. The magnetorheological clutch of claim 1, wherein the clutch is configured as a brake, with the primary part or the secondary part being arranged in a stationary manner.

14. The magnetorheological clutch of claim 1, wherein the magnetorheological clutch has a plurality of disks that are alternately rotationally fixedly connected to the primary part and the secondary part, with the coupling gaps in which a magnetorheological medium is arranged being formed between the disks.

15. A magnetorheological clutch operable for transferring torque from a rotary input member to a rotary output member, comprising:
a first clutch part adapted to be fixed for rotation with the input member;
a second clutch part coaxially surrounding said first clutch part and adapted to be fixed for rotation with the output member, said second clutch part defining an internal chamber having a radial portion and an axially-extending cylindrical portion;
a pot-shaped disk having a radially-extending base section disposed in said radial portion of said chamber and an axially-extending cylindrical section disposed in said cylindrical portion of said chamber, said base section of said disk coupled for rotation with said first clutch part;
a magnetorheological medium disposed in first and second couplings gaps defined within said cylindrical portion of said chamber on opposite sides of said cylindrical section of said disk; and
a magnet for generating a magnetic field extending between said cylindrical section of said disk and at least one of said first and second coupling gaps, wherein said disk is made of a material whose saturation induction when exposed to the magnetic field generated by said magnet is greater than 1.2 tesla, wherein said cylindrical section of said disk is fabricated without material interruption and has a thickness in a range of 0.4 to 1.0 mm.

16. The magnetorheological clutch of claim 15 wherein said magnet is aligned with said cylindrical section of said disk and said cylindrical portion of said chamber such that said magnetic field generated by said magnet is directed substantially perpendicular to an axis of rotation common to said first and second clutch parts.

17. The magnetorheological clutch of claim 16 wherein said magnet is supported by said second clutch part in close proximity to said cylindrical portion of said chamber.

18. The magnetorheological clutch of claim 15 wherein said disk is made from steel selected from a group consisting of DC01, DC03, DC04, DC05 and DC06.

19. The magnetorheological clutch of claim 15 wherein a terminal end portion of said cylindrical section of said disk is deformed to define a brim-like flange configured to seal said first coupling gap from said second coupling gap.

20. The magnetorheological clutch of claim 15 further including a ring element disposed within said chamber and engaging a terminal end portion of said cylindrical section of said disk to seal said first coupling gap relative to said second coupling gap.

21. A magnetorheological clutch, comprising:
first and second clutch parts defining a pot-shaped working chamber therebetween;
a pot-shaped disk disposed in said pot-shaped chamber and being fixed to one of said first and second clutch parts;
a magnetorheological medium disposed in first and second coupling gaps defined within a cylindrical portion of said chamber on opposite sides of a cylindrical section of said disk; and
a magnet for generating a magnetic field extending between said cylindrical section of said disk and said magnetorheological medium in at least one of said first and second coupling gaps,
wherein said cylindrical section of said disk is fabricated without material interruption and has a thickness in a range of 0.4 to 1.0 mm to achieve magnetic saturation of said cylindrical section of said disk when exposed to said magnetic field.

22. The magnetorheological clutch of claim 21 wherein said magnet is aligned with said cylindrical section of said disk and said cylindrical portion of said chamber such that said magnetic field generated by said magnet is directed substantially perpendicular to an axis of rotation common to said first and second clutch parts.

23. The magnetorheological clutch of claim 21 wherein said magnet is supported by said second clutch part in close proximity to said cylindrical portion of said chamber.

24. The magnetorheological clutch of claim 21 wherein said disk is made from steel selected from a group consisting of DC01, DC03, DC04, DC05 and DC06.

25. The magnetorheological clutch of claim 21 wherein a terminal end portion of said cylindrical section of said disk is deformed to define a brim-like flange configured to seal said first coupling gap from said second coupling gap.

26. The magnetorheological clutch of claim 21 further including a ring element disposed within said chamber and engaging a terminal end portion of said cylindrical section of said disk to seal said first coupling gap relative to said second coupling gap.

27. The magnetorheological clutch of claim 21 wherein said first and second clutch parts are both rotatable with said second clutch part coaxially surrounding said first clutch part.

28. The magnetorheological clutch of claim 21 wherein only one of said first and second clutch parts is rotatable.

* * * * *